Oct. 7, 1952 A. R. KANE 2,613,004
APPARATUS FOR TRANSPORTING AND HANDLING
FINELY GROUND MATERIALS
Filed March 5, 1948 6 Sheets-Sheet 1

Fig. 1.

A. R. Kane
INVENTOR

BY C. A. Snow & Co.
ATTORNEYS.

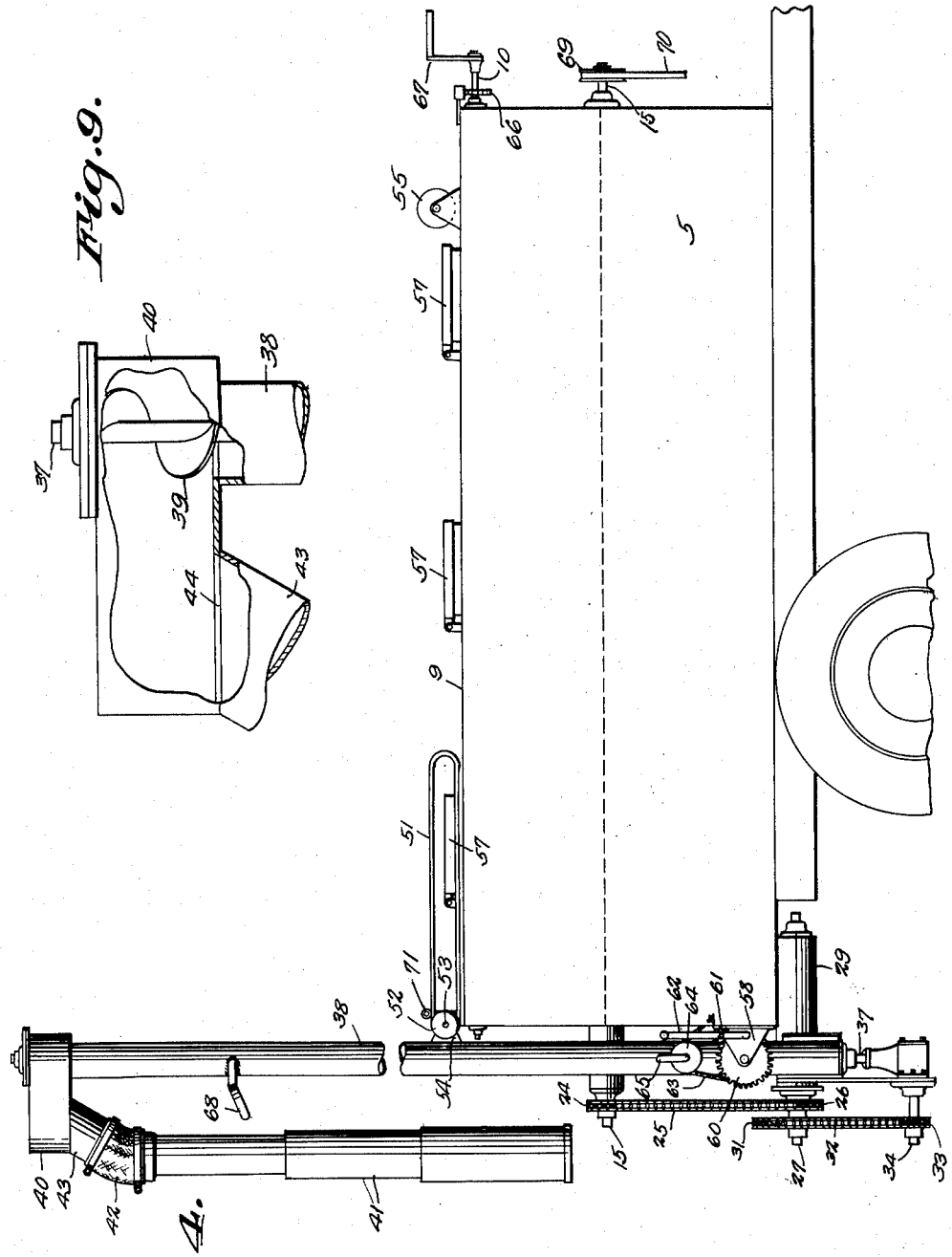

Oct. 7, 1952     A. R. KANE     2,613,004
APPARATUS FOR TRANSPORTING AND HANDLING
FINELY GROUND MATERIALS

Filed March 5, 1948     6 Sheets-Sheet 3

A. R. Kane
INVENTOR

BY C. A. Snow & Co.
ATTORNEYS.

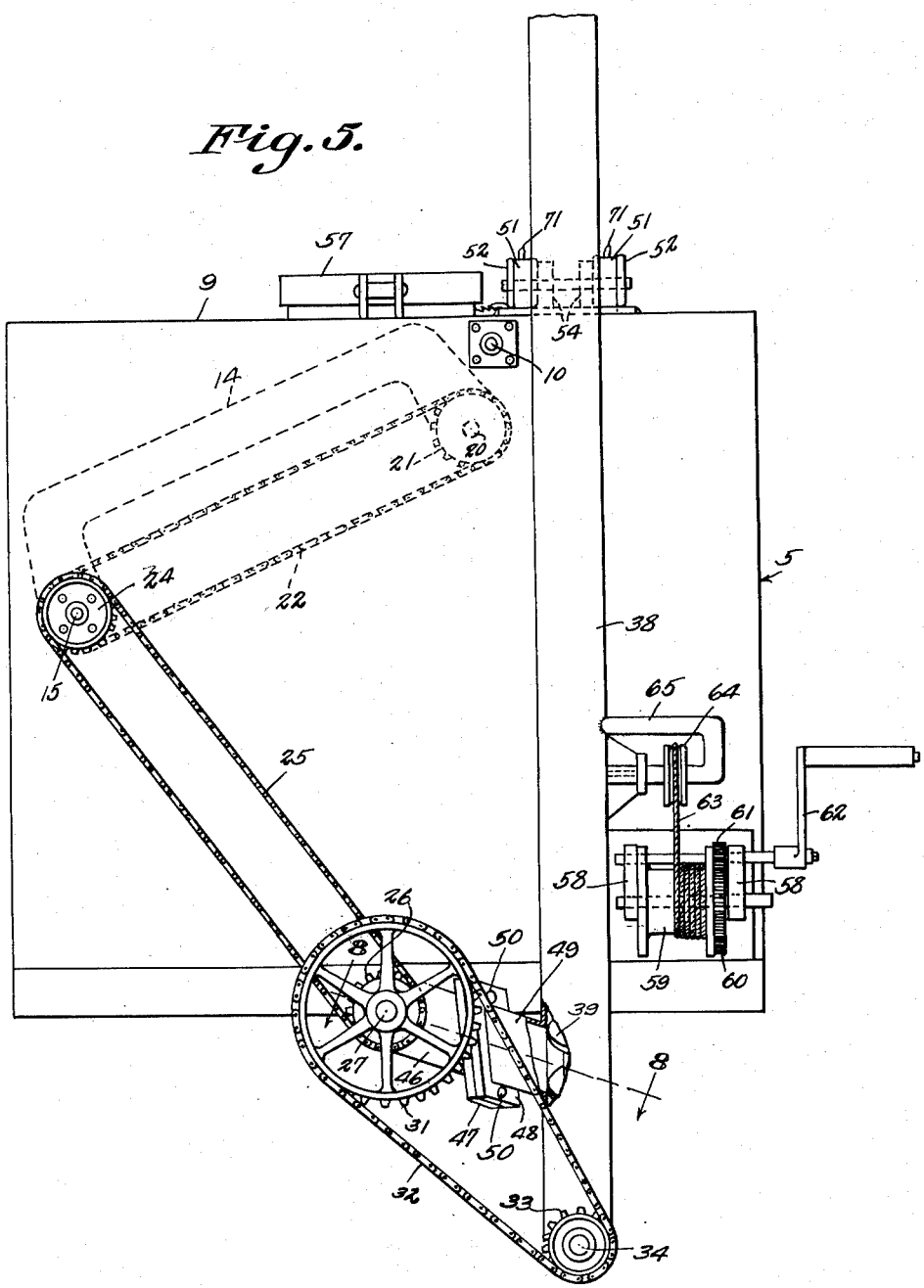

Oct. 7, 1952 — A. R. KANE — 2,613,004
APPARATUS FOR TRANSPORTING AND HANDLING
FINELY GROUND MATERIALS
Filed March 5, 1948 — 6 Sheets-Sheet 5
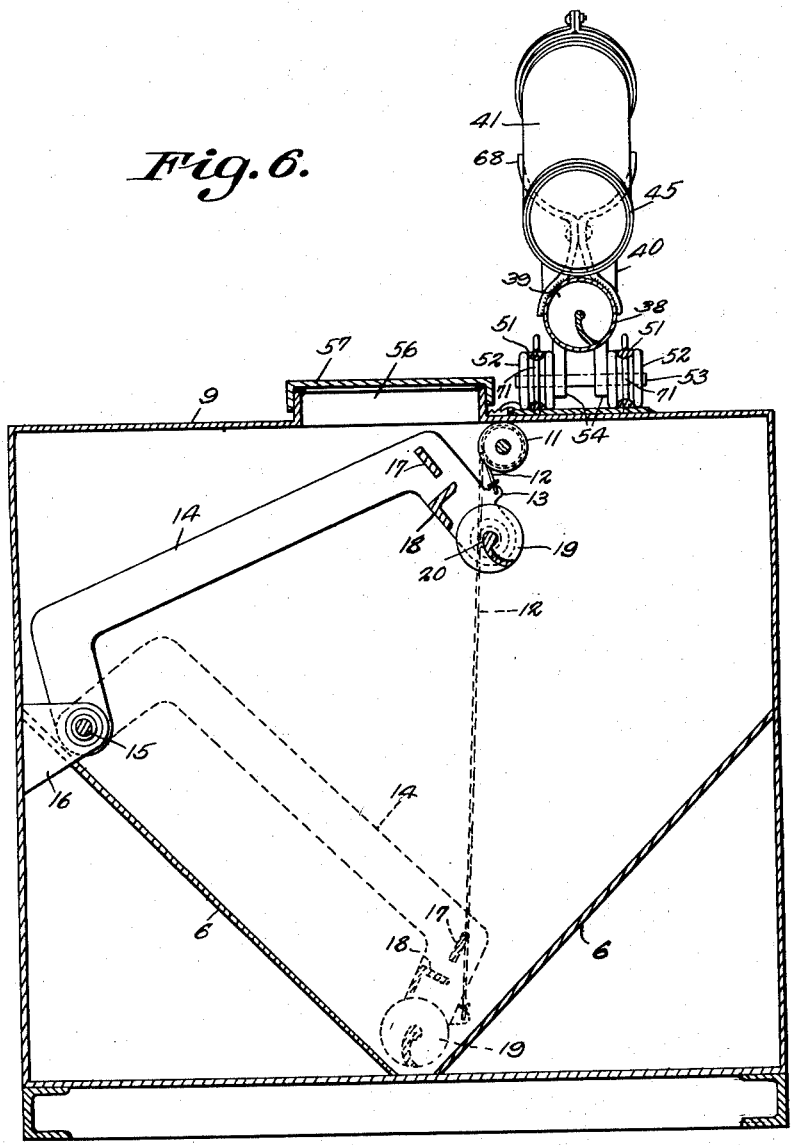
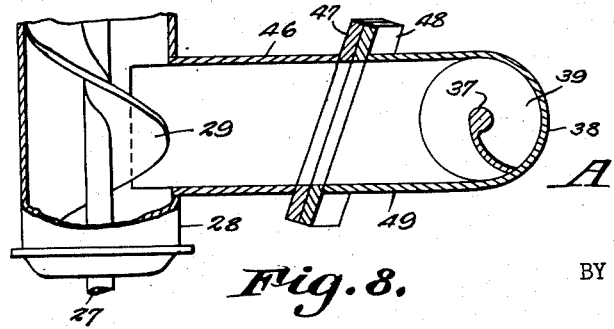

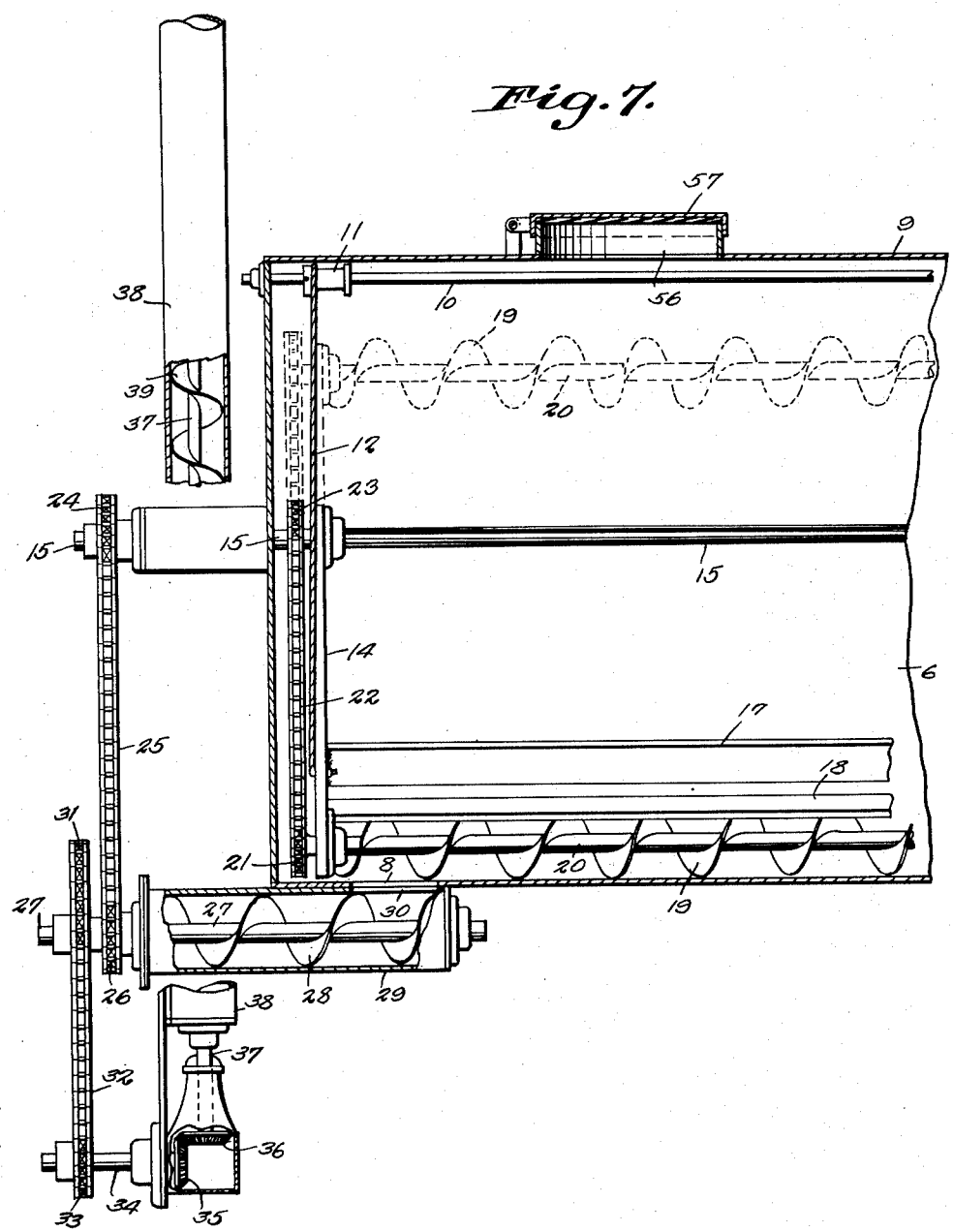

Patented Oct. 7, 1952

2,613,004

UNITED STATES PATENT OFFICE 2,613,004

APPARATUS FOR TRANSPORTING AND HANDLING FINELY GROUND MATERIALS

Arthur R. Kane, Corpus Christi, Tex., assignor to Bulk Barites, Inc., Corpus Christi, Tex., a corporation of Texas Application March 5, 1948, Serial No. 13,136

4 Claims. (Cl. 214—83.32)

By way of illustration it might be stated that in the oil drilling industry, the recognized manner of handling materials commonly known as dry mud, which in reality is "barite" or "bentonite," is to ship the material from the factory to the user in paper sacks which are more or less perishable and frequently break, with tremendous loss and expense to the user.

Further it frequently happens that the material must be quickly deposited in a well, during the drilling operation, to seal the well against escape of gas, to prevent what is commonly known as a "blow-out," resulting from high gas pressure, and which procedure is slow when supplying the material in sacks.

It is, therefore, the primary object of the invention to provide an apparatus for transporting and handling "barite" and "bentonite" or drilling clay commonly known as "dry mud" in bulk, and in large quantities, the apparatus being constructed to facilitate the handling and application of the material in well drilling.

Another object of the invention is to provide an apparatus in which the material is transported, means being provided as a part of the apparatus for feeding the material to a discharge tube in such a way that the water and chemicals with which the materials are proportionately mixed, may be accurately measured to insure the proper consistency for the most effective results.

Still another object of the invention is to provide an apparatus for transporting the material from the rail head to the rig in bulk, thereby appreciably reducing the cost of the material, owing to the elimination of the sacks used in packaging the material.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is a side elevational view of an apparatus constructed in accordance with the invention.

Fig. 4 is a side elevational view of the apparatus, the discharge pipe thereof being shown in its delivering position.

Fig. 5 is an enlarged elevational end view of the apparatus with the delivery tube as moved to its active position.

Fig. 6 is a sectional view taken on line 6—6 of Fig. 1.

Fig. 7 is a fragmental sectional view on an enlarged scale through the delivery end of the body portion of the apparatus.

Fig. 8 is a sectional view taken on line 8—8 of Fig. 5.

Fig. 9 is an enlarged elevational view partly broken away, illustrating the connecting head between the main delivery pipe and the adjustable section of the main delivery pipe.

Figure 2:
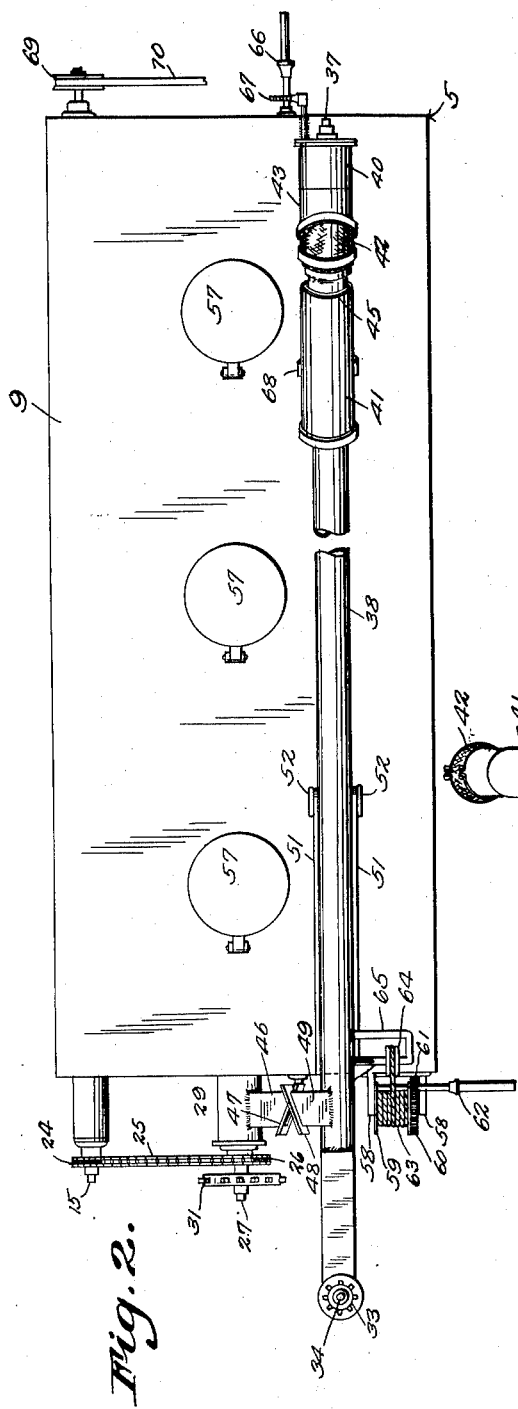
Fig. 2 is a plan view thereof.
Figure 3:
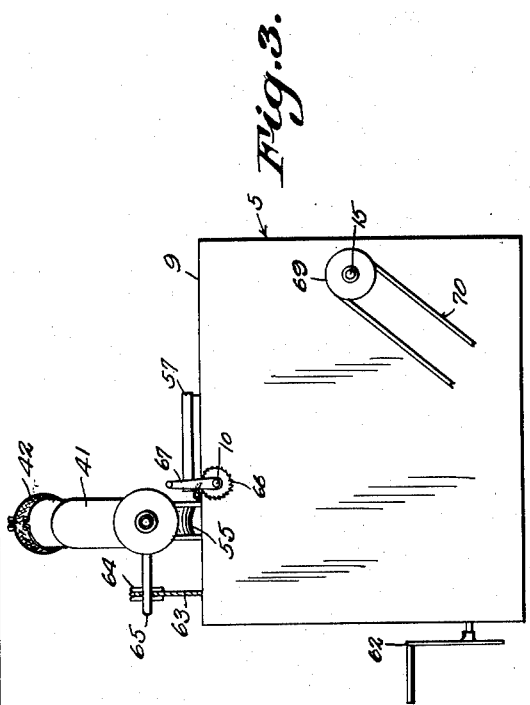
Fig. 3 is an end elevational view of the apparatus.

Referring to the drawings in detail, the apparatus comprises a wheel supported body 5, which may be in the form of a trailer or a removable tank for position on a trailer.

As shown, the body 5 is provided with inclined bottom plates 6, which extend throughout the length of the body, the lower ends of the plates being spaced apart providing a clearance for the spiral or screw conveyor operating therein and to be hereinafter more fully described. These plates cause the granular material supported within the body to gravitate to the center of the body, there being provided the discharge opening 8 at one end of the bottom, through which material is discharged from the body.

Arranged within the body 5 and disposed adjacent to the top 9 thereof, is a horizontal shaft 10 on the ends of which are secured drums 11 on which the cables 12 are wound, the cables being connected with the ears 13 extending from the free ends of the arms 14 that are adjustably mounted on the shaft 15, that in turn is supported in bearings formed in the brackets 16 that extend beyond the inner side wall of the body 5.

The free ends of the arms 14 are held in spaced relation with respect to each other, by means of the bars 17 and 18, which are shown as having their ends welded to the arms 14. Mounted for rotary movement between the arms 14 is the spiral conveyor 19 which forms a part of the shaft 20 mounted in bearings in the arms 14, one end of the shaft 20 extending through one of the arms 14, where it is supplied with the sprocket 21 over which the chain 22 operates, the chain 22 also operating over the sprocket 23, which is secured to the shaft 15 to rotate therewith. This shaft 15 extends an appreciable distance beyond one end of the body, where it is supplied with the sprocket 24 over which the chain 25 operates, the chain 25 also operating over the sprocket 26 secured to the shaft 27 that forms a part of the spiral conveyor 28 that operates within the discharge tube 29 disposed directly under the discharge opening 8 of the body, the tube having an opening 30 that registers with the opening 8 so that material within the body may pass through the registering openings into the discharge tube 29.

Also secured on the shaft 27 is the sprocket 31 over which the chain 32 operates, the chain also operating over the sprocket 33 where it is secured on one end of the shaft 34 on the inner end of which is secured the pinion 35. This pinion 35 meshes with the pinion 36 secured at the lower end of the shaft 37 operating in the discharge pipe 38, the shaft 37 forming a part of the spiral conveyor 39 that rotates within the discharge pipe 38 delivering material to the head 40, which is in communication with the free end of the discharge pipe 38. The head 40 is also in communication with the delivery spout 41, the connection between the delivery head and spout 41 being made through the flexible pipe section 42 and pipe 43 which extends from the head 40 and is arranged opposite the opening 44 of the discharge head.

The delivery spout is made up of a plurality of sections 45 which telescope so that the length of the delivery spout may be readily adjusted for accomplishing a particular delivery of the material.

As clearly shown by Fig. 5 of the drawings, the discharge tube 29 is formed with an opening that registers with the tube 46, the outer or free end of the tube 46 having a marginal flange 47 at its discharge end, the marginal flange and free end of the tube being disposed at an oblique angle to abut against the marginal flange 48 that is formed at the free end of the tube 49 that extends from the discharge pipe 38, the pipe 38 and pipe 49 having openings so that material may pass through the tubes 46 and 49 into the pipe 38. The marginal flanges 47 and 48 are so arranged that when they come together, a close fit is provided to insure against leakage of material at this point. Bolts 50 are positioned in the openings of the flanges 47 and 48 and secure them together. Mounted on the top of the body 5 are spaced tracks 51 on which the wheels 52 operate, the wheels 52 being mounted at the ends of the shaft 53 supported in bearing openings formed in the spaced bearing brackets 54, which are secured to the discharge pipe 38. Adjacent to the opposite end of the body 5, is a roller 55 which has a curved periphery for the reception of the discharge pipe 38, so that when the discharge pipe 38 rests therein, lateral movement of the discharge pipe 38 will be prevented.

The discharge pipe 38 is moved to this position directly above the top of the body 5, when the device is being transported with its load.

Filling openings 56 are provided in the top of the body 5, the filling openings being normally closed by means of the hinged closures 57, which are so constructed that they will exclude moisture, to maintain the material in the body, in a dry condition at all times.

When it is desired to swing the discharge pipe 38 from the vertical position shown by Fig. 4 of the drawings to the horizontal position shown by Fig. 1 of the drawings, the chain 32 is removed from its sprockets leaving the lower end of the discharge pipe 38 free.

Extending from the rear end of the body 5, are the brackets 58 which have bearing openings for the reception of a shaft on which the drum 59 is secured, the drum 59 having the gear 60 at one end thereof that meshes with the gear 61 rotated by means of the crank handle 62. Wound on the drum 59 is the cable 63, which passes over the pulley 64 that operates on the arm 65 extending laterally from the discharge pipe 38, the discharge end of the cable 63 being secured to the end of the body 5 adjacent to the drum 59. This cable 63 when wound on the drum 59, operates to pull the lower end of the discharge pipe 38 towards the rear end of the body, holding the same in an upright position for discharging the material from the body 5.

As shown by the drawings, the horizontal shaft 10 extends through one end of the body 5, where it is supplied with the crank handle 66, there being provided a pawl and ratchet 67 for limiting rotary movement of the shaft. By this structure, the shaft 10 and drums 11 mounted thereon, may be rotated to raise the arms 14 from the dotted line position as shown by Fig. 6 of the drawings, to the position shown in full lines or at the top of the load.

It might be further stated that when the discharge pipe 38 has been moved to the position as shown by Fig. 1 of the drawings, the delivery spout 41 is positioned in the bracket 68 mounted on the discharge pipe 38 to hold the delivery spout against lateral movement. The pipe 38 is held against longitudinal movement by means of the pin 71 mounted in an opening of the track 51. As shown by Fig. 4, the pin 71 is moved to the opposite end of track 51 to hold the pipe against movement while in a vertical position. The shaft 15 constitutes the power shaft of the apparatus and extends through the front end of the body 5, where it supports the pulley 69 that is secured thereto, the pulley and shaft receiving motion from a power take-off of the engine or power plant of the apparatus (not shown) through the belt 70.

In operation the apparatus is loaded with material at the rail-head or factory and the material is transported to the rig or deposited in a tank at the rig.

The discharge pipe is now swung from the position as shown by Fig. 1 of the drawings to the position as shown by Fig. 5 of the drawings. It will, of course, be understood that prior to the loading of the body, the arms 14 are moved to their uppermost positions as shown by Fig. 6, with the result that when the body is filled with material, the spiral conveyor rests on the material and follows the material as it is being discharged from the body. Due to the rotation of the spiral conveyor 19, the finely ground material is not only agitated but is fed towards the discharge opening. As the material passes from the discharge opening of the body into the discharge tube 29, the material is forced through the discharge tube 29 and into the discharge pipe 38, where the material is elevated by the spiral conveyor 39 operating within the discharge pipe 38, where the material is fed into the head 40 and then into the delivery spout 41.

With this construction the material may be delivered in bulk to the rig, and may be readily unloaded rapidly without waste.

Having thus described the invention, what is claimed is:

1. An apparatus for transporting and handling ground materials, comprising a body having a discharge opening at one end thereof, a vertically movable spiral conveyor rotatable in a horizontal plane, resting on the surface of the material handled within the body portion, means for rotating the spiral conveyor whereby material is fed longitudinally of the body portion to the discharge opening, a discharge tube communicating with the body through the discharge opening, a spiral conveyor operating within the discharge tube feeding material longitudinally of the tube, and a discharge pipe including a spiral conveyor into which material is fed from the discharge tube, and a delivery spout mounted on the discharge end of the discharge pipe.

2. An apparatus for transporting and handling finely divided materials, comprising a body having a discharge opening at its lower end, a vertically movable spiral conveyor rotatable in a horizontal plane, adapted to rest upon the surface of the material handled within the body portion, means for rotating the spiral conveyor whereby material is fed to the discharge opening, a discharge tube communicating with the body through the discharge opening, a spiral conveyor operating within the discharge tube feeding material longitudinally of the tube, and a discharge pipe including a spiral conveyor into which material is fed from the discharge tube.

3. An apparatus for transporting and handling finely divided materials which comprises a container having a bottom portion of substantial horizontal extent and having a discharge opening interrupting and extending through said bottom portion and of an area comprising a fraction of that of said bottom portion, a spiral screw conveyer underlying said discharge opening and adapted upon operation to move material from a position directly beneath said discharge opening in a lateral direction with respect to said opening, whereby the extent of exposure of said conveyer to the weight of material in the container is limited by the size of said opening, and an impeller within said container adapted to rest freely upon the surface of a body of material in said container, said impeller extending from a point substantially overlying said opening, along a path overlying the uninterrupted portion of said bottom surface to a point remote from the point overlying said opening, and adapted upon operation to impel surface portions of the body of material toward said opening.

4. In an apparatus for transporting and handling finely divided material, a vehicle body having a discharge opening therein, a discharge tube communicating with the body through said opening, a movable discharge pipe pivoted at an intermediate point along its length upon a support member movably mounted upon the body whereby said pipe can be swung from a substantially vertical operating position to a substantially horizontal out-of-the-way traveling position, and discharge connection parts carried by the discharge tube and discharge pipe adapted to register with the discharge pipe in operative position to establish communication therebetween.

ARTHUR R. KANE.

REFERENCES CITED

The following references are of record in the file of this patent:

UNITED STATES PATENTS

| Number | Name | Date |
|---|---|---|
| 718,921 | David | Jan. 20, 1903 |
| 1,570,360 | Lippoldt | Jan. 19, 1926 |
| 1,949,861 | Call | Mar. 6, 1934 |
| 2,139,417 | Milan | Dec. 6, 1938 |
| 2,185,415 | Miles | Jan. 2, 1940 |
| 2,209,625 | Jensen | July 30, 1940 |
| 2,298,332 | Applegate | Oct. 13, 1942 |
| 2,381,780 | Simons | Aug. 7, 1945 |
| 2,417,020 | Shugart | Mar. 4, 1947 |
| 2,431,000 | Step | Nov. 18, 1947 |
| 2,438,301 | Schulte | Mar. 23, 1948 |
| 2,439,541 | Hall | Apr. 13, 1948 |
| 2,458,031 | Rome | Jan. 4, 1949 |